United States Patent
Katsumata

(10) Patent No.: US 10,572,994 B2
(45) Date of Patent: Feb. 25, 2020

(54) RADIATION IMAGING APPARATUS, RADIATION IMAGING SYSTEM, RADIATION IMAGING METHOD, AND COMPUTER-READABLE MEDIUM

(71) Applicant: CANON KABUSHIKI KAISHA, Tokyo (JP)

(72) Inventor: Shinya Katsumata, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 67 days.

(21) Appl. No.: 15/896,653

(22) Filed: Feb. 14, 2018

(65) Prior Publication Data

US 2018/0232872 A1    Aug. 16, 2018

(30) Foreign Application Priority Data

Feb. 15, 2017   (JP) ................................. 2017-026299

(51) Int. Cl.
*G06F 9/00*   (2006.01)
*G06T 7/00*   (2017.01)

(52) U.S. Cl.
CPC ............ *G06T 7/001* (2013.01); *G06T 7/0002* (2013.01); *G06T 7/0012* (2013.01); *G06T 2207/10116* (2013.01); *G06T 2207/30004* (2013.01); *G06T 2207/30168* (2013.01)

(58) Field of Classification Search
CPC ............ G06T 2207/30004; G06T 2207/10116
See application file for complete search history.

(56) References Cited

U.S. PATENT DOCUMENTS

| | | | |
|---|---|---|---|
| 2013/0121468 A1* | 5/2013 | Ohta | A61B 6/4405 378/63 |
| 2013/0156158 A1* | 6/2013 | Noji | A61B 5/08 378/62 |
| 2016/0015333 A1* | 1/2016 | Morita | A61B 6/502 378/22 |
| 2016/0029991 A1* | 2/2016 | Tajima | A61B 6/5294 378/98 |

FOREIGN PATENT DOCUMENTS

| | | |
|---|---|---|
| JP | 2013-102848 A | 5/2013 |
| JP | 2014-79558 A | 5/2014 |

\* cited by examiner

*Primary Examiner* — Oneal R Mistry
(74) *Attorney, Agent, or Firm* — Carter, DeLuca & Farrell LLP

(57) ABSTRACT

Provided is a radiation imaging apparatus, which is configured to acquire a radiographic image, the radiation imaging apparatus including: an evaluation unit configured to evaluate the radiographic image based on a plurality of evaluation indices; a determination unit configured to determine priorities of the plurality of evaluation indices; and an output unit configured to output propriety information regarding whether the radiographic image is proper based on evaluation results of the plurality of evaluation indices and the priorities.

29 Claims, 5 Drawing Sheets

FIG.4

| No | CHARACTER STRING TO BE SELECTED |
|----|----------------------------------|
| 1  | RE-IMAGING MAY BE REQUIRED. |
| 2  | PROBLEM MIGHT OCCUR IN IMAGING |
| 3  | MINOR PROBLEM MIGHT OCCUR IN IMAGING |
| 4  | NO PROBLEM HAS BEEN DETECTED IN IMAGING |

RADIATION IMAGING APPARATUS, RADIATION IMAGING SYSTEM, RADIATION IMAGING METHOD, AND COMPUTER-READABLE MEDIUM

BACKGROUND OF THE INVENTION

Field of the Invention

The present invention relates to a radiation imaging apparatus configured to evaluate a radiographic image, a radiation imaging system, a radiation imaging method, and a computer-readable medium.

Description of the Related Art

In medical fields, there is used a radiation imaging apparatus configured to create a radiographic image of a subject to be examined through use of a radiation for the purpose of diagnosis.

In the radiation imaging apparatus, it is generally verified whether or not a radiographic image is proper for a diagnosis after imaging. When it is determined in image verification that the radiographic image is not proper for the diagnosis, it is required to perform radiation imaging again (re-imaging).

In the image verification, it is required to verify various factors regarding image quality, for example, whether or not a radiographic image contains a blur due to the body movement of a subject, whether or not it is difficult to view a diagnostic body part due to a piece of clothing or an accessory overlapping with the diagnostic body part, and whether or not the diagnostic body part is overflowing from the radiographic image.

In recent years, there have been developed, for example, a body movement detection function of detecting the movement of a subject, which is described in Japanese Patent Application Laid-Open No. 2014-79558, and a lung field loss determination function of detecting that a part of a lung field is overflowing from a radiographic image when a chest is imaged, which is described in Japanese Patent Application Laid-Open No. 2013-102848.

The methods according to the related art can provide various kinds of information for assistance with the image verification, but require an operator (user) to determine whether or not a radiographic image is proper in consideration of those kinds of information comprehensively.

Therefore, there have been problems in that users may reach different conclusions in the image verification depending on their subjective points of view or their proficiency, and that the verification of various factors may require much time until it is determined whether or not a radiographic image is proper.

SUMMARY OF THE INVENTION

According to one embodiment of the present invention, there is provided a radiation imaging apparatus, which is configured to acquire a radiographic image, the radiation imaging apparatus including: an evaluation unit configured to evaluate the radiographic image based on a plurality of evaluation indices; a determination unit configured to determine priorities of the plurality of evaluation indices; and an output unit configured to output propriety information regarding whether the radiographic image is proper based on evaluation results of the plurality of evaluation indices and the priorities.

Further features of the present invention will become apparent from the following description of exemplary embodiments with reference to the attached drawings.

BRIEF DESCRIPTION OF THE DRAWINGS

FIG. 4 is a table for showing an example of a character string list (character information) indicating the evaluation results.

DESCRIPTION OF THE EMBODIMENTS

Preferred embodiments of the present invention will now be described in detail in accordance with the accompanying drawings.

(First Embodiment)

Figure 1:
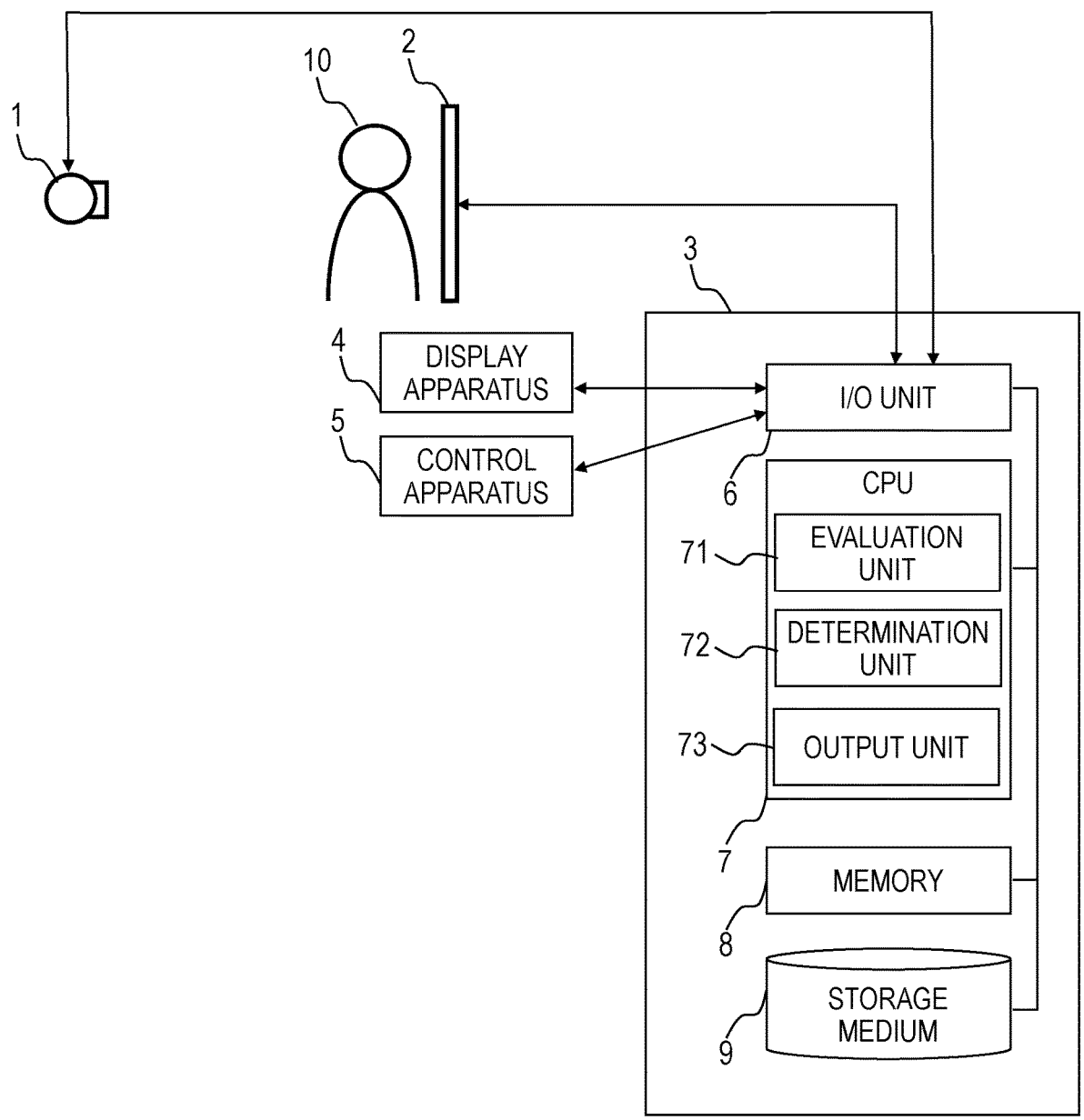
FIG. 1 is a configuration diagram of a radiation imaging system configured to acquire a radiographic image.

In a first embodiment of the present invention, a configuration example of a radiation imaging system for achieving the present invention is described. The following description is given with reference to FIG. 1 being a configuration diagram of the radiation imaging system configured to acquire a radiographic image.

A radiation generator (generation unit) 1 generates a radiation, and irradiates a planar radiation detector (detection unit) 2 with the radiation. In order to image a subject 10, the subject 10 is placed in an imaging region between the radiation generator 1 and the planar radiation detector 2. The planar radiation detector 2 irradiated with the radiation detects the radiation, converts the radiation into a radiographic image, and transmits the radiographic image to an I/O unit 6 of an image processing apparatus 3. At this time, the radiation generator 1 may transmit a dose, a tube voltage, and other such imaging-related information (hereinafter referred to as "imaging information") obtained when an image is acquired to the image processing apparatus 3.

The I/O unit 6 acquires the radiographic image, and also acquires the imaging information. The radiographic image and the imaging information are stored in a storage medium 9, and are temporarily read into a memory 8 to be subjected to imaging evaluation derivation processing S300 by a CPU (control unit) 7. However, a GPU, a chip for image processing, or other such arithmetic unit may be used in place of the CPU 7. The CPU (control unit) 7 includes an evaluation unit 71, a determination unit 72, and an output unit 73.

An imaging evaluation derived in the imaging evaluation derivation processing S300 is displayed on a display apparatus 4. A control apparatus 5 is used to, for example, input an operation of the image processing apparatus and the imaging information to the image processing apparatus 3.

Figure 2:
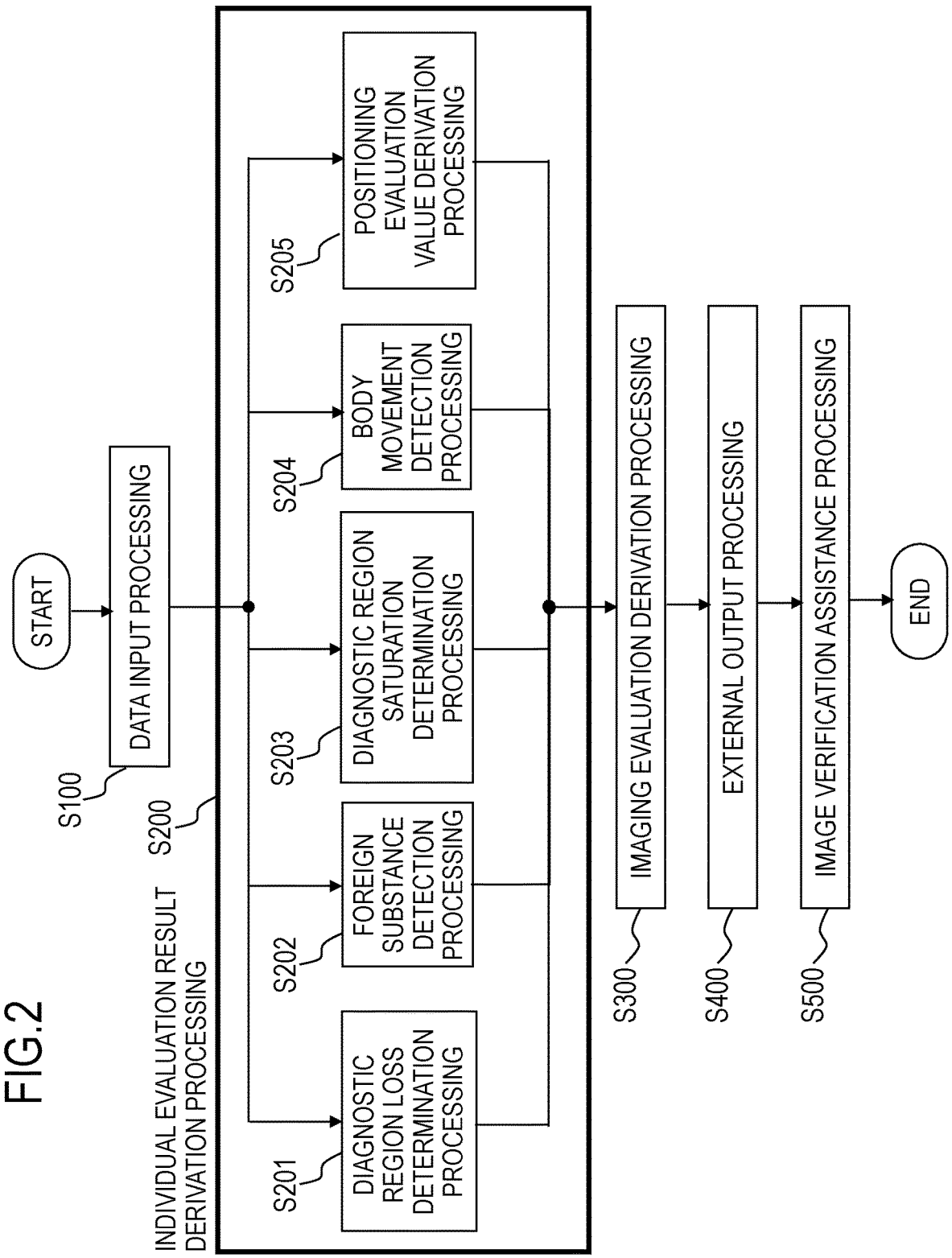
FIG. 2 is a flowchart for illustrating an outline of processing for evaluating a radiographic image and imaging information that are input to an image processing apparatus and outputting an imaging evaluation.

FIG. 2 is a flowchart for illustrating an outline of processing for evaluating the radiographic image and the imaging information that have been input to the image processing apparatus 3 and outputting the imaging evaluation. The evaluation unit 71 evaluates the radiographic image based on a plurality of evaluation indices.

In the first embodiment, the plurality of evaluation indices include at least two selected from the group consisting of: a loss evaluation for evaluating whether or not a target body part (for example, lung field) is included in a predetermined image region (diagnostic region) of the radiographic image; a foreign substance evaluation for evaluating whether or not a foreign substance is included in a predetermined image region (diagnostic region) of the radiographic image; a saturation evaluation for evaluating whether or not the radiographic image has been saturated due to an excessive dose of the radiation; a body movement evaluation for evaluating the movement of a target body part; and a positioning evaluation for evaluating a position or a direction of a target body part.

First, data input processing S100 for inputting a radiographic image and the imaging information that are used for performing the evaluations is performed. The imaging information includes an imaged body part and the gender and age of a subject in addition to the tube voltage and the dose.

Subsequently, individual evaluation result derivation processing S200 for individual evaluations being evaluations of the respective evaluation indices is performed in order to evaluate whether or not the radiographic image is proper for a diagnosis based on the radiographic image and the imaging information that have been input. The individual evaluation result derivation processing S200 involves evaluations based on determination processing and detection processing regarding the plurality of evaluation indices.

For example, for the loss evaluation, lung field loss determination processing S201 for detecting that a part of a lung field is overflowing from the radiographic image when a chest is imaged, which is described in Japanese Patent Application Laid-Open No. 2013-102848, is used. For the foreign substance evaluation, foreign substance detection processing S202 for detecting whether or not a piece of clothing or an accessory of a subject is being displayed with an overlap with a diagnostic region is used. For the saturation evaluation, diagnostic region saturation determination processing S203 for determining whether or not a diagnostic region of the radiographic image has been saturated due to an excessive dose is used.

For the body movement evaluation, body movement detection processing S204 for detecting the movement of a subject, which is described in Japanese Patent Application Laid-Open No. 2014-79558, is used. For the positioning evaluation, positioning evaluation value derivation processing S205 for evaluating whether or not the radiographic image has been acquired so as to have the diagnostic region easy to view is used. In this manner, image evaluation technologies known in the field of radiation imaging are used.

The evaluation unit 71 may evaluate the radiographic image based on body movement evaluation for evaluating the movement of a target body part in a predetermined image region (diagnostic region) of the radiographic image. In this case, when the radiographic image is improper in the predetermined image region (diagnostic region), the output unit 73 outputs information indicating that re-imaging of the radiographic image is required. Meanwhile, when the radiographic image is proper in the predetermined image region (diagnostic region), the output unit 73 outputs information indicating that re-imaging of the radiographic image is unrequired.

Subsequently, in order to calculate the imaging evaluation to be presented to a user, the imaging evaluation (propriety information) derivation processing S300 is performed on the individual evaluations obtained in the individual evaluation result derivation processing S200. In the imaging evaluation derivation processing S300, the imaging evaluation corresponding to the degree of properness of the radiographic image is derived from a plurality of individual evaluations. In addition, not only the individual evaluations but also the imaging information including the tube voltage, the dose, and the age, gender, and weight of the subject may be used to derive the imaging evaluation.

Figure 3:
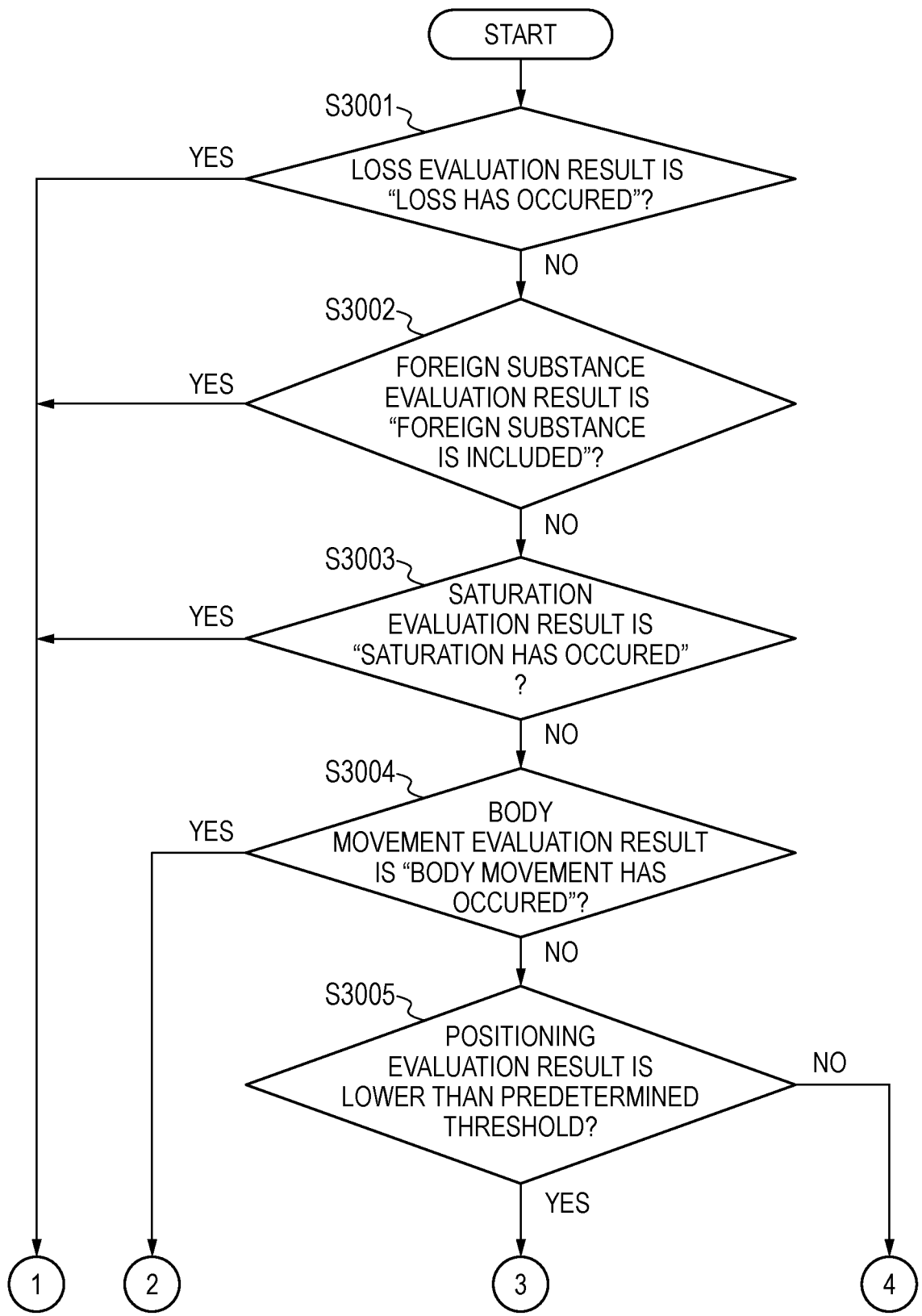
FIG. 3 is a flowchart for illustrating an example of processing for outputting evaluation results.

As a specific example of the imaging evaluation derivation processing S300, processing for outputting evaluation results in four stages based on a character string list is described. FIG. 3 is a flowchart for illustrating an example of the processing for outputting the evaluation results in the four stages. FIG. 4 is a table for showing an example of the character string list (character information) indicating the evaluation results in the four stages. The numerical values of from "1" to "4", which are the imaging evaluations of FIG. 3, correspond to No. 1 to No. 4 within the character string list of FIG. 4.

As illustrated in FIG. 3, in this method, the imaging evaluation is derived by conditional branching based on the individual evaluations. The conditional branching is performed based on the individual evaluations obtained in the individual evaluation result derivation processing S200. The imaging evaluation is also performed on the individual evaluations in such a priority order as to assign a higher priority to the individual evaluation having a higher relationship to the determination of whether or not re-imaging is required. In the first embodiment, conditional branching processing is performed in the order of conditional branching processing S3001 for the loss evaluation, conditional branching processing S3002 for the foreign substance evaluation, and conditional branching processing S3003 for the saturation evaluation.

However, the priority order may differ depending on the technique or the user, and the present invention is not necessarily limited to the priority order of the first embodiment.

The determination unit 72 determines the priorities of the evaluation indices. The determination unit 72 raises the priority as the evaluation index exhibits a higher probability that the radiographic image is required to be subjected to re-imaging, while the determination unit 72 lowers the priority as the evaluation index exhibits a lower probability that the radiographic image is required to be subjected to re-imaging. That is, the determination unit 72 raises the priority as the relationship between the evaluation of the evaluation index and the re-imaging of the radiographic image becomes stronger, and lowers the priority as the relationship between the evaluation of the evaluation index and the re-imaging of the radiographic image becomes weaker. The determination unit 72 determines the relationship between the evaluation of the evaluation index and the re-imaging of the radiographic image from past data indicating that the radiographic image has been subjected to re-imaging based on the evaluation of the evaluation index.

The output unit 73 outputs the imaging evaluation (propriety information) regarding whether or not the radiographic image is proper based on the evaluation result and the priority of each of the individual evaluations. The display apparatus 4 may display the radiographic image evaluated as being improper when the radiographic image is evaluated as being improper based on the imaging evaluation (propriety information).

When the individual evaluation indicating that the radiographic image is "improper for diagnosis" is derived in one of the individual evaluations of the conditional branching processing S3001, S3002, and S3003, the propriety information of No. 1 of FIG. 4, which is the lowest imaging evaluation among the four stages, is output. The lowest imaging evaluation among the four stages is the evaluation index having the highest probability that the radiographic image is required to be subjected to re-imaging. Therefore, the user is encouraged in the re-imaging of the radiographic image.

When it is evaluated that a "loss has occurred" in the conditional branching processing S3001, the display apparatus 4 may display a loss region of the radiographic image. The user is allowed to verify whether or not a part of the lung field is overflowing from the radiographic image when the chest is imaged. When it is evaluated that a "foreign substance is included" in the conditional branching processing S3002, the display apparatus 4 may display a foreign substance region of the radiographic image. The user is allowed to verify whether or not a piece of clothing or an accessory of the subject is being displayed with an overlap with the diagnostic region. When it is evaluated that "saturation has occurred" in the conditional branching processing S3003, the display apparatus 4 may display a saturated region of the radiographic image. The user is allowed to verify whether or not the radiographic image has been saturated due to an excessive dose. In short, when the radiographic image is evaluated as being improper, the display apparatus 4 displays the radiographic image (evaluated region) evaluated as being improper.

When the individual evaluations indicating that the radiographic image is proper for the diagnosis are derived in the individual evaluations of the conditional branching processing S3001, S3002, and S3003, conditional branching processing S3004 for the body movement evaluation is performed. Whether or not the body movement interferes with the diagnosis varies depending on a location at which the body has moved and the magnitude of the movement. In regard to the body movement, there are cases in which the radiographic image is required to be subjected to re-imaging and in which the radiographic image is unrequired to be subjected to re-imaging. Therefore, when the individual evaluation indicating that the radiographic image is "improper for diagnosis" is derived in the individual evaluation of the conditional branching processing S3004, that is, when the body movement is detected, the propriety information of No. 2 of FIG. 4, which is the second lowest evaluation result among the four stages, is output.

In this case, whether or not the radiographic image is proper may be derived for a diagnostic region (for example, lung field) set in advance. When it is evaluated that a "body movement has occurred" in the conditional branching processing S3004, the display apparatus 4 may enlarge and display a body movement region of the radiographic image. When the body movement region evaluated by the evaluation unit 71 overlaps with the diagnostic region set in advance, the output unit 73 may output information indicating that the re-imaging is required. When the body movement region evaluated by the evaluation unit 71 does not overlap with the diagnostic region set in advance, the output unit 73 may output information indicating that the re-imaging is unrequired.

When the individual evaluation indicating that the radiographic image is proper for the diagnosis is derived in the individual evaluation of the conditional branching processing S3004, conditional branching processing S3005 for a positioning evaluation result is performed. It is highly probable that the positioning does not greatly interfere with the diagnosis, and hence even when the individual evaluation indicating that the radiographic image is "improper for diagnosis" is derived in the individual evaluation of the conditional branching processing S3005, the propriety information of No. 3 of FIG. 4, which is the second highest evaluation result among the four stages, is output.

When the individual evaluation indicating that the radiographic image is proper for the diagnosis is derived in the individual evaluation of the conditional branching processing S3005 without any problem with all the individual evaluations, the propriety information of No. 4 of FIG. 4, which is the highest evaluation result among the four stages, is output. In this case, whether or not the radiographic image is proper may be derived for the diagnostic region (for example, lung field) set in advance.

In this manner, the priorities of the loss evaluation, the foreign substance evaluation, the saturation evaluation, the body movement evaluation, and the positioning evaluation become lower in the stated order.

The output unit 73 outputs the imaging evaluation (propriety information) by at least one of character information, image information, or a numerical value, and can derive one imaging evaluation from a plurality of individual evaluations. The imaging evaluation derivation processing S300 is not limited to the one described above, and it is possible to perform the imaging evaluation through use of a determination device that has learned the evaluation results of diagnostic images obtained in advance by machine learning. The machine learning can be achieved through use of a support vector machine, a neural network, or other such known technology.

Subsequently, external output processing S400 for presenting the imaging evaluation is performed. In the external output processing S400, output contents may be output to a recording medium on a server as electronic data for an imager for monitor output or film output, an electronic medical chart, or the like.

As the output contents, not only the imaging evaluation is output, but also all the individual evaluations may be output, or partial results of the individual evaluations may be output. The output unit 73 outputs the evaluation of the evaluation index by at least one of the character information, the image information, or the numerical value. For example, the output unit 73 may output the result that the radiographic image has been evaluated as being "improper for diagnosis" by specifying, among the individual evaluations, the loss evaluation result indicating that the "loss has occurred", the foreign substance evaluation result indicating that the "foreign substance is included", or the like. When an image recording medium is output as in the case of the film output, the imaging evaluation and the individual evaluation may be recorded as characters in the image recording medium.

Finally, image verification assistance processing S500 for assistance with the image verification is performed.

Figure 5:
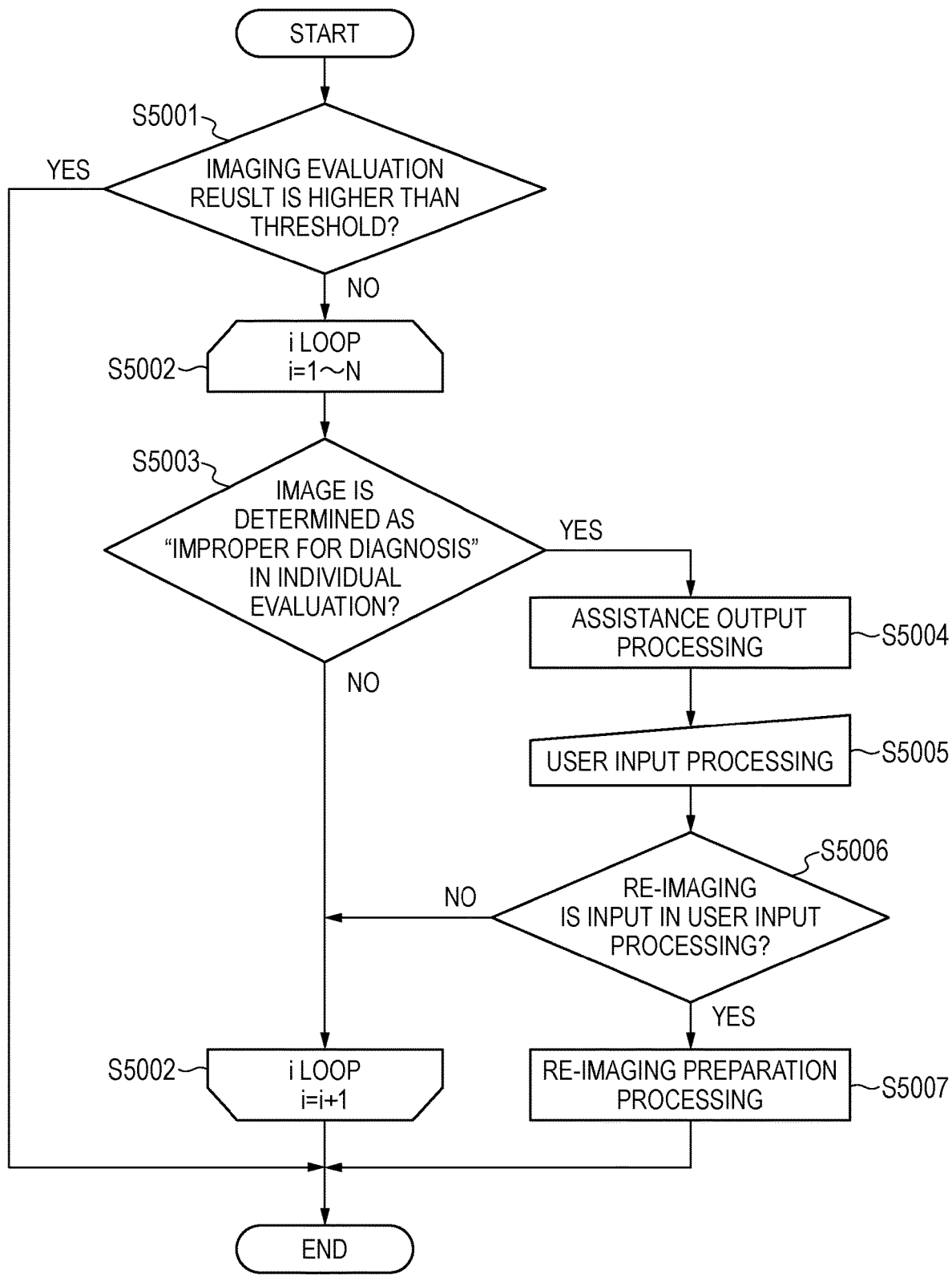
FIG. 5 is a flowchart for illustrating an example of image verification assistance processing.

FIG. 5 is a flowchart for illustrating an example of the image verification assistance processing S500. First, conditional branching processing S5001 for the imaging evaluation for determining whether or not the assistance with the image verification is required by comparing the imaging evaluation with a threshold value set in advance is performed. When the imaging evaluation is output based on the four stages shown in FIG. 4, the threshold value is set by being selected from the values of from "1" to "4" of the four stages. The threshold value set in advance may be a threshold value freely set by the user, or an average of the imaging evaluations that require re-imaging may be examined in advance to be set as the threshold value.

When the imaging evaluation is not higher than the threshold value, in i-loop processing S5002, conditional branching processing S5003 for the individual evaluation is performed for each of the individual evaluations. In this case, each value of the index i is assigned to each of total N individual evaluation indices of the radiographic image. For example, the values of the index i are assigned to the individual evaluation indices so that "1" indicates the loss evaluation, "2" indicates the foreign substance evaluation, "3" indicates the saturation evaluation, "4" indicates the body movement evaluation, and "5" indicates the positioning evaluation. The individual evaluation indices to be assigned to the respective values of the index i are not limited thereto, and may be freely set. For example, "1" may be assigned to the positioning evaluation.

When the radiographic image is proper for the diagnosis in the conditional branching processing S5003 for the individual evaluation, the assistance with the image verification is unrequired, and hence the processing is brought to an end. When the radiographic image is "improper for diagnosis" in the conditional branching processing S5003 for the individual evaluation, assistance output processing S5004 is performed.

The assistance output processing S5004 has an object to provide assistance with the determination of image quality by displaying a problem of the improper image on the radiographic image or a UI in view of the result that the radiographic image has been evaluated as being improper in the individual evaluation.

In the assistance output processing S5004, the output unit 73 outputs the evaluation of the evaluation index by at least one of the character information, the image information, or the numerical value. As a specific example, when it is evaluated that a "loss has occurred" in the loss evaluation, the output unit 73 displays a part of the diagnostic region, which is determined to be overflowing from the radiographic image, on the display apparatus 4 as the image information. When it is evaluated that a "foreign substance is included" in the foreign substance evaluation, the output unit 73 displays the region, which has been determined as the foreign substance, on the display apparatus 4 as the image information with a color being applied thereto. When it is evaluated that "saturation has occurred", the output unit 73 displays the region, in which it is determined that the "saturation has occurred", on the display apparatus 4 as the image information with a color being applied thereto. When the body movement is detected, the output unit 73 enlarges the region of the radiographic image in which the body movement has been detected, and displays the enlarged region on the display apparatus 4. In this manner, a display mode of the radiographic image or a display mode of the assistance output to be displayed on the display apparatus 4 is changed so as to allow the user to verify the radiographic image based on each of the individual evaluations.

After the assistance output processing S5004, user input processing S5005 regarding input using the control apparatus 5 is performed when the user verifies the assistance output to determine whether or not to subject the radiographic image to re-imaging or whether or not to continue the image verification.

Conditional branching processing S5006 for the user input for determining whether or not the result input in the user input processing S5005 is the re-imaging is performed. When the re-imaging has not been input in the user input processing, the processing returns to the i-loop processing S5002. When the re-imaging has been input in the user input processing, re-imaging preparation processing S5007 is performed.

The re-imaging preparation processing S5007 has an object to prepare for the re-imaging of the radiographic image. As a specific example, in order to allow the radiation generator 1 and the planar radiation detector 2 to acquire the radiographic image, the I/O unit 6 transmits a control signal, and the display apparatus 4 displays information indicating preparation for imaging.

Through use of the above-mentioned method, the results obtained from a plurality of image evaluation units are combined to be displayed for the user when it is verified whether or not the radiographic image acquired by the radiation imaging system is proper. As a result, it is possible to reduce time and labor of the user who verifies a plurality of evaluation results one by one, improve objectivity of the image verification, and reduce a time period required for determining whether or not the re-imaging is required.

(Second Embodiment)

In a second embodiment of the present invention, the method of obtaining the imaging evaluation (propriety information) by the numerical value in the imaging evaluation derivation processing S300 is described. Descriptions of the same components, the same functions, and the same operations as those of the first embodiment are omitted, and differences between the first embodiment and the second embodiment are mainly described. The apparatus components and the processing components other than the imaging evaluation derivation processing S300 are the same as those of the first embodiment, and hence descriptions thereof are omitted. The following description is directed to the imaging evaluation derivation processing S300.

In the imaging evaluation derivation processing S300, the imaging evaluation is derived based on the individual evaluations obtained from the derivation processing for a plurality of individual evaluations. An example of the method of numerically deriving the imaging evaluation can be achieved through use of Expression (1). Expression (1) is a derivation expression for an imaging evaluation on the assumption that the maximum value of the evaluation is 100 and the minimum value of the evaluation is 0.

$$E = 100 - \sum_n Wn \cdot Dn \qquad (1)$$

In Expression (1), E represents the imaging evaluation, and n represents a number for distinguishing the derivation processing for the plurality of individual evaluations. Dn represents the individual evaluation, and Wn represents a weighting factor. The output unit 73 outputs the imaging evaluation (propriety information) E by assigning a weight to the evaluation of the evaluation index based on the priority.

In this case, the individual evaluation Dn is set to 1 when the radiographic image is evaluated as being improper in the individual evaluation result derivation processing, and is set to 0 when the radiographic image is evaluated as being proper. When the degree of properness of the radiographic image is output by continuous numerical values in the individual evaluation result derivation processing, the values may be used. In this manner, the individual evaluation Dn may be at least one selected from the group consisting of the two values and the continuous values. In the case of Expression (1), the value becomes smaller as the degree of properness of the radiographic image becomes higher.

The weighting factor Wn may be obtained through principal component analysis, covariance structure analysis, or other such multivariate analysis by, for example, collecting evaluation points for radiographic images from the user in advance in regard to the individual evaluation and using results thereof as teacher data. As the weighting factor becomes larger, the priority of the evaluation index becomes higher. In this manner, the determination unit 72 may perform statistical processing on the past data indicating that the radiographic image has been subjected to re-imaging based on the evaluation of the evaluation index, to thereby determine the relationship between the evaluation of the evaluation index and the re-imaging of the radiographic image, and determine the weighting factor and the priority of the evaluation index based on the relationship.

Through use of the above-mentioned method, when the image verification is performed for a radiation imaging apparatus, the results obtained from the plurality of individual evaluations can be combined to display the numerical evaluation results for the user. As a result, it is possible to reduce the time and labor of the user who verifies the plurality of individual evaluations, improve the objectivity of the image verification, and reduce the time period required for determining whether or not the re-imaging is required.

According to the above mentioned embodiments, the image verification can be performed objectively, and it is possible to reduce the time period required for determining whether or not the radiographic image is proper.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-026299, filed Feb. 15, 2017, which is hereby incorporated by reference herein in its entirety.

What is claimed is:

1. A radiation imaging apparatus, which is configured to acquire a radiographic image, the radiation imaging apparatus comprising:
   one or more processors; and
   a memory including instructions stored thereon that, when executed by the one or more processors, cause the radiation imaging apparatus to function as:
      an evaluation unit configured to evaluate the radiographic image based on a plurality of evaluation indices;
      a determination unit configured to determine priorities of the plurality of evaluation indices; and
      an output unit configured to output propriety information regarding whether the radiographic image is proper based on evaluation results of the plurality of evaluation indices and the priorities,
   wherein the determination unit is configured to raise each of the priorities as a corresponding one of the plurality of evaluation indices exhibits a higher probability that the radiographic image is required to be subjected to re-imaging, and to lower each of the priorities as a corresponding one of the plurality of evaluation indices exhibits a lower probability that the radiographic image is required to be subjected to re-imaging.

2. The radiation imaging apparatus according to claim 1, wherein the determination unit is configured to raise each of the priorities as a relationship between a corresponding one of the evaluation results of the plurality of evaluation indices and re-imaging of the radiographic image becomes stronger, and to lower each of the priorities as the relationship between a corresponding one of the evaluation results of the plurality of evaluation indices and re-imaging of the radiographic image becomes weaker.

3. The radiation imaging apparatus according to claim 2, wherein the determination unit is configured to determine the relationship from past data indicating that the radiographic image has been subjected to re-imaging based on each of the evaluation results of the plurality of evaluation indices.

4. The radiation imaging apparatus according to claim 1, wherein the output unit is configured to output the propriety information by at least one of character information, image information, or a numerical value.

5. The radiation imaging apparatus according to claim 1, wherein the output unit is configured to output at least one of the evaluation results of the plurality of evaluation indices by at least one of character information, image information, or a numerical value.

6. The radiation imaging apparatus according to claim 1, wherein the output unit is configured to assign a weight to each of the evaluation results of the plurality of evaluation indices based on a corresponding one of the priorities to output the propriety information.

7. The radiation imaging apparatus according to claim 1, wherein the instructions, when executed by the one or more processors, further cause the radiation imaging apparatus to function as a display unit configured to display, if the radiographic image is evaluated as being improper based on the propriety information, the radiographic image evaluated as being improper.

8. The radiation imaging apparatus according to claim 1, wherein the evaluation unit is configured to evaluate the radiographic image based on a body movement evaluation for evaluating a movement of a target body part in a predetermined image region of the radiographic image.

9. The radiation imaging apparatus according to claim 8, wherein the output unit is configured to output, if the radiographic image is improper in the predetermined image region, information indicating that re-imaging of the radiographic image is required.

10. The radiation imaging apparatus according to claim 8, wherein the output unit is configured to output, if the radiographic image is proper in the predetermined image region, information indicating that re-imaging of the radiographic image is unrequired.

11. A radiation imaging apparatus, which is configured to acquire a radiographic image, the radiation imaging apparatus comprising:
  one or more processors; and
  a memory including instructions stored thereon that, when executed by the one or more processors, cause the radiation imaging apparatus to function as:
    an evaluation unit configured to evaluate the radiographic image based on a plurality of evaluation indices;
    a determination unit configured to determine priorities of the plurality of evaluation indices; and
    an output unit configured to output propriety information regarding whether the radiographic image is proper based on evaluation results of the plurality of evaluation indices and the priorities,
  wherein the plurality of evaluation indices include at least two selected from the group consisting of:
    a loss evaluation for evaluating whether a target body part is included in a predetermined image region of the radiographic image;
    a foreign substance evaluation for evaluating whether a foreign substance is included in a predetermined image region of the radiographic image;
    a saturation evaluation for evaluating whether the radiographic image has been saturated due to an excessive dose of a radiation;
    a body movement evaluation for evaluating a movement of a target body part; and
    a positioning evaluation for evaluating one of a position and a direction of a target body part.

12. The radiation imaging apparatus according to claim 11, wherein the priorities of the loss evaluation, the foreign substance evaluation, the saturation evaluation, the body movement evaluation, and the positioning evaluation become lower in a stated order.

13. A radiation imaging system, which is configured to acquire a radiographic image from a detected radiation, the radiation imaging system comprising:
  one or more processors; and
  a memory including instructions stored thereon that, when executed by the one or more processors, cause the radiation imaging system to function as:
    a generation unit configured to generate the radiation;
    a detection unit configured to detect the radiation;
    an evaluation unit configured to evaluate the radiographic image based on a plurality of evaluation indices;
    a determination unit configured to determine priorities of the plurality of evaluation indices; and
    an output unit configured to output propriety information regarding whether the radiographic image is proper based on evaluation results of the plurality of evaluation indices and the priorities,
  wherein the determination unit is configured to raise each of the priorities as a corresponding one of the plurality of evaluation indices exhibits a higher probability that the radiographic image is required to be subjected to re-imaging, and to lower each of the priorities as a corresponding one of the plurality of evaluation indices exhibits a lower probability that the radiographic image is required to be subjected to re-imaging.

14. A radiation imaging method for acquiring a radiographic image, the radiation imaging method comprising:
  evaluating the radiographic image based on a plurality of evaluation indices;
  determining priorities of the plurality of evaluation indices; and
  outputting propriety information regarding whether the radiographic image is proper based on evaluation results of the plurality of evaluation indices and the priorities,
  wherein in the determining, raising each of the priorities as a corresponding one of the plurality of evaluation indices exhibits a higher probability that the radiographic image is required to be subjected to re-imaging, and lowering each of the priorities as a corresponding one of the plurality of evaluation indices exhibits a lower probability that the radiographic image is required to be subjected to re-imaging.

15. A non-transitory computer-readable medium having stored thereon a program to be executed by a processor to cause the processor to execute each step of the radiation imaging method of claim 14.

16. An image processing apparatus configured to perform processing on a radiographic image, the image processing apparatus comprising:
  one or more processors; and
  a memory including instructions stored thereon that, when executed by the one or more processors, cause the image processing apparatus to function as:
    an evaluation unit configured to evaluate the radiographic image based on a plurality of evaluation indices;
    a determination unit configured to determine priorities of the plurality of evaluation indices; and
    an output unit configured to output propriety information regarding whether the radiographic image is proper based on evaluation results of the plurality of evaluation indices and the priorities,
  wherein the determination unit is configured to raise each of the priorities as a corresponding one of the plurality of evaluation indices exhibits a higher probability that the radiographic image is required to be subjected to re-imaging, and to lower each of the priorities as a corresponding one of the plurality of evaluation indices exhibits a lower probability that the radiographic image is required to be subjected to re-imaging.

17. The image processing apparatus according to claim 16, wherein the determination unit is configured to raise each of the priorities as a relationship between a corresponding one of the evaluation results of the plurality of evaluation indices and re-imaging of the radiographic image becomes stronger, and to lower each of the priorities as the relationship between a corresponding one of the evaluation results of the plurality of evaluation indices and re-imaging of the radiographic image becomes weaker.

18. The image processing apparatus according to claim 17, wherein the determination unit is configured to determine the relationship from past data indicating that the radiographic image has been subjected to re-imaging based on each of the evaluation results of the plurality of evaluation indices.

19. The image processing apparatus according to claim 16, wherein the output unit is configured to output the propriety information by at least one of character information, image information, or a numerical value.

20. The image processing apparatus according to claim 16, wherein the output unit is configured to output at least one of the evaluation results of the plurality of evaluation indices by at least one of character information, image information, or a numerical value.

21. The image processing apparatus according to claim 16, wherein the output unit is configured to assign a weight to each of the evaluation results of the plurality of evaluation indices based on a corresponding one of the priorities to output the propriety information.

22. The image processing apparatus according to claim 16, wherein the instructions, when executed by the one or more processors, further cause the image processing apparatus to function as a display unit configured to display, if the radiographic image is evaluated as being improper based on the propriety information, the radiographic image evaluated as being improper.

23. An image processing apparatus configured to perform processing on a radiographic image, the image processing apparatus comprising:
  one or more processors; and
  a memory including instructions stored thereon that, when executed by the one or more processors, cause the image processing apparatus to function as:
    an evaluation unit configured to evaluate the radiographic image based on a plurality of evaluation indices;
    a determination unit configured to determine priorities of the plurality of evaluation indices; and
    an output unit configured to output propriety information regarding whether the radiographic image is proper based on evaluation results of the plurality of evaluation indices and the priorities,
  wherein the plurality of evaluation indices include at least two selected from the group consisting of:
    a loss evaluation for evaluating whether a target body part is included in a predetermined image region of the radiographic image;
    a foreign substance evaluation for evaluating whether a foreign substance is included in a predetermined image region of the radiographic image;
    a saturation evaluation for evaluating whether the radiographic image has been saturated due to an excessive dose of a radiation;
    a body movement evaluation for evaluating a movement of a target body part; and
    a positioning evaluation for evaluating one of a position and a direction of a target body part.

24. The image processing apparatus according to claim 23, wherein the priorities of the loss evaluation, the foreign substance evaluation, the saturation evaluation, the body movement evaluation, and the positioning evaluation become lower in a stated order.

25. The image processing apparatus according to claim 23, wherein the evaluation unit is configured to evaluate the radiographic image based on a body movement evaluation for evaluating a movement of a target body part in a predetermined image region of the radiographic image.

26. The image processing apparatus according to claim 25, wherein the output unit is configured to output, if the radiographic image is improper in the predetermined image region, information indicating that re-imaging of the radiographic image is required.

27. The image processing apparatus according to claim 25, wherein the output unit is configured to output, if the radiographic image is proper in the predetermined image region, information indicating that re-imaging of the radiographic image is unrequired.

28. An image processing method for performing processing on a radiographic image, the image processing method comprising:
  evaluating the radiographic image based on a plurality of evaluation indices;
  determining priorities of the plurality of evaluation indices; and
  outputting propriety information regarding whether the radiographic image is proper based on evaluation results of the plurality of evaluation indices and the priorities
  wherein in the determining, raising each of the priorities as a corresponding one of the plurality of evaluation indices exhibits a higher probability that the radiographic image is required to be subjected to re-imaging, and lowering each of the priorities as a corresponding one of the plurality of evaluation indices exhibits a lower probability that the radiographic image is required to be subjected to re-imaging.

29. A non-transitory computer-readable medium having stored thereon a program to be executed by a processor to cause the processor to execute each step of the image processing method of claim 28.

* * * * *